(12) United States Patent
Laffey et al.

(10) Patent No.: US 6,844,887 B2
(45) Date of Patent: Jan. 18, 2005

(54) ALTERNATE REDUCED SIZE ON-SCREEN POINTERS FOR ACCESSING SELECTABLE ICONS IN HIGH ICON DENSITY REGIONS OF USER INTERACTIVE DISPLAY INTERFACES

(75) Inventors: Patrick Justin Laffey, Cedar Park, TX (US); Jessica Kelley Murillo, Hutto, TX (US); Johnny Meng-Han Shieh, Austin, TX (US); Kim-Khanh Vu Tran, Austin, TX (US); Scott Trieu Tran, Austin, TX (US)

(73) Assignee: International Business Machine Corporation, Armonk, NY (US)

( * ) Notice: Subject to any disclaimer, the term of this patent is extended or adjusted under 35 U.S.C. 154(b) by 518 days.

(21) Appl. No.: 09/899,458

(22) Filed: Jul. 5, 2001

(65) Prior Publication Data

US 2003/0007016 A1 Jan. 9, 2003

(51) Int. Cl.⁷ .................................................. G09G 5/00
(52) U.S. Cl. ...................... 345/861; 345/835; 345/846; 345/856; 345/859; 345/860; 345/862
(58) Field of Search ................................. 345/145, 861, 345/173, 835, 846, 856, 859, 860, 862

(56) References Cited

U.S. PATENT DOCUMENTS

| | | | | |
|---|---|---|---|---|
| 5,740,390 A | * | 4/1998 | Pickover et al. | 345/835 |
| 5,767,855 A | | 6/1998 | Bardon et al. | 345/355 |
| 6,160,539 A | * | 12/2000 | Fleck | 345/173 |
| 6,236,389 B1 | * | 5/2001 | Imaizumi et al. | 345/145 |
| 6,642,947 B2 | * | 11/2003 | Feierbach | 345/861 |

* cited by examiner

*Primary Examiner*—Ba Huynh
*Assistant Examiner*—Mylinh Tran
(74) *Attorney, Agent, or Firm*—Diana C. Roberts; Jerry Kraft; Volel Emile

(57) ABSTRACT

In an interactive display interface, an implementation switching to an alternate smaller sized cursor when the original sized cursor does not have the minimum clearance between the target icon and other adjacent icons to permit a clear user selection of the target icon. A predetermined minimum clearance factor is set. As the cursor moves toward the target icon, there is a determination made as to whether the arrangement of the target icon with respect to its adjacent icons exceeds the minimum clearance factor. If not, there is an implementation for reducing the size of the cursor so that the minimum clearance factor is exceeded.

18 Claims, 8 Drawing Sheets

$d \div s > R$

STEP 1 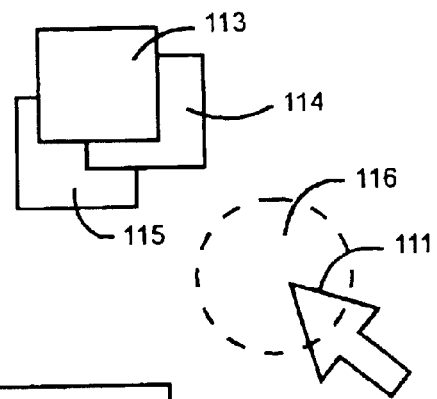
STEP 2 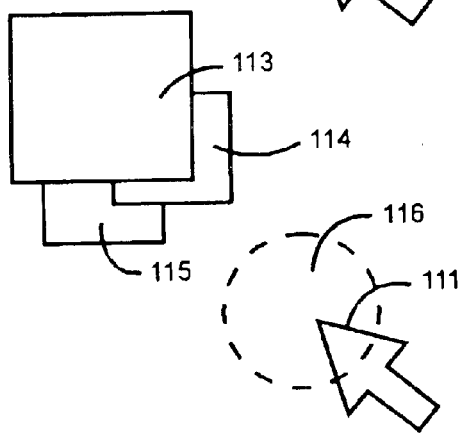
STEP 3 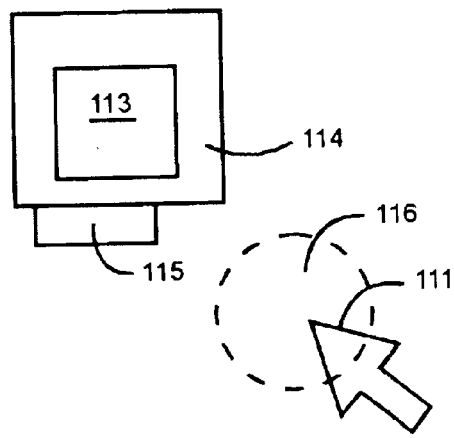
FIG. 11
STEP 4 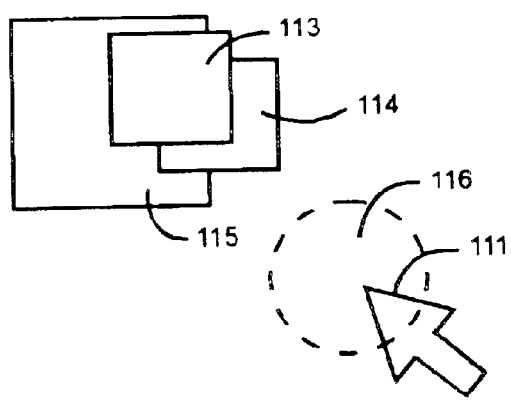

ALTERNATE REDUCED SIZE ON-SCREEN POINTERS FOR ACCESSING SELECTABLE ICONS IN HIGH ICON DENSITY REGIONS OF USER INTERACTIVE DISPLAY INTERFACES

CROSS REFERENCE

United States Patent Applications: TEMPORARILY MOVING ADJACENT OR OVERLAPPING ICONS AWAY FROM SPECIFIC ICONS BEING APPROACHED BY AN ON-SCREEN POINTER ON USER INTERACTIVE DISPLAY INTERFACES Ser. No. 09/899/,616 and DIRECTING USERS' ATTENTION TO SPECIFIC ICONS BEING APPROACHED BY AN ON-SCREEN POINTER ON USER INTERACTIVE DISPLAY INTERFACES Ser. No. 09/899,604 having the same inventors and assignee of the present application and filed concurrently herewith and hereby incorporated by reference.

1. Technical Field

The present invention relates to user interactive computer supported display technology and particularly to such user interactive systems and methods that are user friendly and provide computer users with an interface environment that is easy to use, even in displays which are crowded and cluttered with icons.

2. Background of Related Art

The past decade has been marked by a technological revolution driven by the convergence of the data processing industry with the consumer electronics industry. This advance has been even further accelerated by the extensive consumer and business involvement in the Internet or World Wide Web (Web) over the past several years. The terms Internet and Web are used interchangeably throughout this application. As a result of these changes, it seems as if virtually all aspects of human endeavor in the industrialized world require human-computer interfaces. These changes have made computer directed activities accessible to a substantial portion of the industrial world's population, which, up to a few years ago, was computer-illiterate, or, at best, computer indifferent.

In order for the vast computer supported industries and market places to continue to thrive, it will be necessary for increasing numbers of workers and consumers who are limited in computer skills to become involved with computer interfaces.

Despite all of the great changes that have been made in the computer industry, the screen cursor controlled manually by the user still remains the primary human-computer interface. The user still commands the computer primarily through manual pointing devices such as mice, joy sticks and trackballs which control the on-screen cursor movements. It must be noted that the principles involved in such pointing devices were developed over a generation ago when most of the people involved in interfaces to computer were computer professionals who were willing to invest great amounts of time in developing computer skills. It is very possible that had computers originally been the mass consumer, business and industry implements which they are today, user interfaces that were much easier and required less skill to use would have been originally sought and developed. Nonetheless, the manually controlled cursor movement devices are our primary access for cursor control. The present invention is directed to making mouse, trackball and the like cursor control devices more user friendly and effective.

Icons in Graphical User Interfaces (GUIs) are, of course, the primary access through which the user may interactively select substantially all computer functions and data. Thus, the number of icons that the user has to contend with in the navigation of his cursor to his target icon has been greatly increasing. These may be arranged in many layers of windows. In certain portions of the user's display screen, there may be dense populations of icons. The icons may overlap or be stacked one on the other.

In addition, the user's desktop display screens have been increasing in size to thereby provide the user with the luxury of some room for icon spacing to visually separate icons. On the other hand, users are extensively using laptop computers, and palm-type devices including Personal Digital Assistants (PDAs) and even cell phone displays to supplement their desktops. Thus, the desktop displays need to be replicated on these smaller screen devices to thereby make the icons even more closely spaced. In any event, whether it be on the desktop, laptop or a smaller screen device, the selection of icons or like displayed objects and items from crowded screen areas presents a problem.

SUMMARY OF THE PRESENT INVENTION

The present invention offers an implementation for the interactive selection of icons from display screen areas crowded with a high density of icons. The invention provides a user activated cursor control device, such as a trackball or mouse, that is movable in the four orthogonal directions. The control device is connected to the computer which includes means for converting the user activated orthogonal movements into cursor or pointer movements in said four directions. The key to the present invention is in the setting of a predetermined minimum clearance factor with respect to the target items or icons being approached which is required in order that a pointer or cursor of the current size have sufficient clearance to select an item or icon. There are means for determining whether a selectable icon being approached by said pointer has this minimum clearance factor, in combination with means responsive to a determination that said approached item does not have said minimum clearance factor for reducing the size of said pointer to a pointer having a reduced minimum clearance factor that is appropriate for a selection of the target icon.

In some user interactive display interfaces, the minimum clearance factor may be determined primarily as a minimum clearance distance that the target icon must be spaced from all adjacent icons. In other words, the target or approached icon must be further from its closest adjacent icon than the minimum clearance distance required for an icon selection by the particular size pointer or cursor being used. If not, the cursor is reduced in size to a cursor having such a minimum clearance distance.

In other user interactive interfaces, a more comprehensive determination of the minimum clearance factor may be made that includes not only the distance that the target icon is spaced from adjacent icons but also the visible dimensions of the target icon. For example the minimum clearance factor may be defined by:

$$\text{Minimum Clearance} = d + s$$

wherein:
  d is the widest visible dimension of the approached icon, and
  s is the space between the approached icon and the closest adjacent icon in a continuation of the d dimension line.

BRIEF DESCRIPTION OF THE DRAWINGS

The present invention will be better understood and its numerous objects and advantages will become more apparent to those skilled in the art by reference to the following drawings, in conjunction with the accompanying specification, in which:

FIG. 11 is a progressive magnified view for stages of a portion of an illustrative display screen in which a group of icons are so closely clustered together that the icons/cursor arrangement initially fails to have minimum clearance, and an icon enlargement sequence follows enabling the user to reach his target icon.

DETAILED DESCRIPTION OF THE PREFERRED EMBODIMENT

Figure 1:
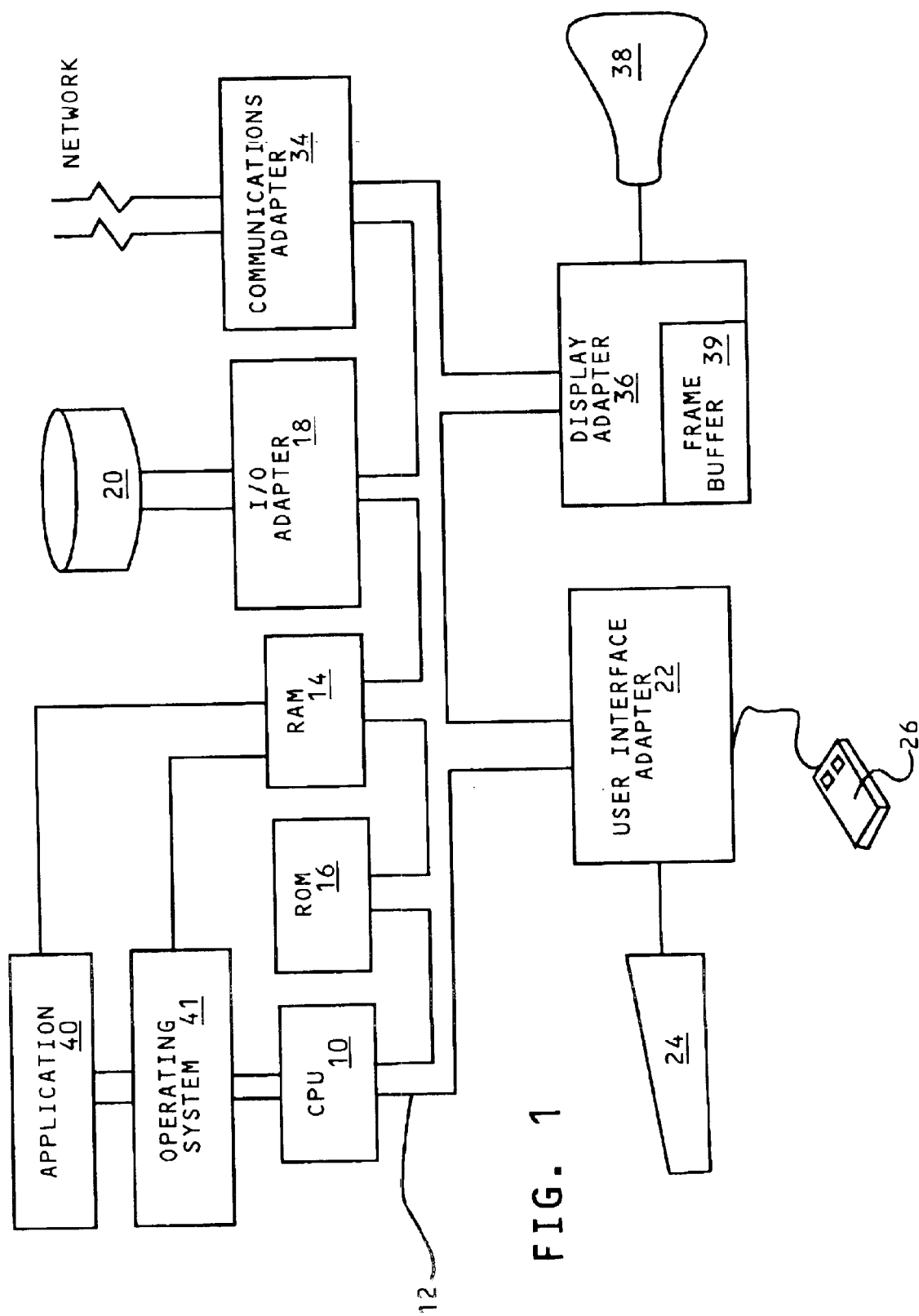
FIG. 1 is a block diagram of a generalized data processing system including a central processing unit that provides the computer controlled interactive display system which may be used in practicing the present invention.

Referring to FIG. 1, a typical data processing system is shown that may function as the computer controlled display terminal used in implementing the system of the present invention of providing a reduced sized cursor when the full sized cursor has a minimum clearance factor that is not exceeded by the cursor/target icon arrangement. A central processing unit (CPU) 10, such as any PC microprocessor in a PC available from International Business Machines Corporation (IBM) or Dell Corp., is provided and interconnected to various other components by system bus 12. An operating system 41 runs on CPU 10, provides control and is used to coordinate the function of the various components of FIG. 1. Operating system 41 may be one of the commercially available operating systems such as Microsoft's Windows98™ or WindowsNT™, as well as the UNIX or IBM's AIX operating systems. An application program for providing a reduced sized cursor when the full sized cursor has a minimum clearance factor that is not exceeded by the cursor/target icon arrangement to be subsequently described in detail, runs in conjunction with operating system 41 and provides output calls to the operating system 41, which in turn implements the various functions to be performed by the application 40. A Read Only Memory (ROM) 16 is connected to CPU 10 via bus 12 and includes the Basic Input/Output System (BIOS) that controls the basic computer functions. Random Access Memory (RAM) 14, I/O adapter 18 and communications adapter 34 are also interconnected to system bus 12. It should be noted that software components, including operating system 41 and application 40, are loaded into RAM 14, which is the computer system's main memory. I/O adapter 18 may be a Small Computer System Interface (SCSI) adapter that communicates with the disk storage device 20, i.e. a hard drive. Communications adapter 34 interconnects bus 12 with an outside network enabling the data processing system to communicate with other such systems over a Local Area Network (LAN) or Wide Area Network (WAN), which includes, of course, the Internet. I/O devices are also connected to system bus 12 via user interface adapter 22 and display adapter 36. Keyboard 24 and mouse 26 are all interconnected to bus 12 through user interface adapter 22. Mouse 26 operates in a conventional manner insofar as user movement is concerned. Display adapter 36 includes a frame buffer 39, which is a storage device that holds a representation of each pixel on the display screen 38. Images may be stored in frame buffer 39 for display on monitor 38 through various components such as a digital to analog converter (not shown) and the like. By using the aforementioned mouse or related devices, a user is capable of inputting information to the system through the keyboard 24 or mouse 26 and receiving output information from the system via display 38.

Figure 2:
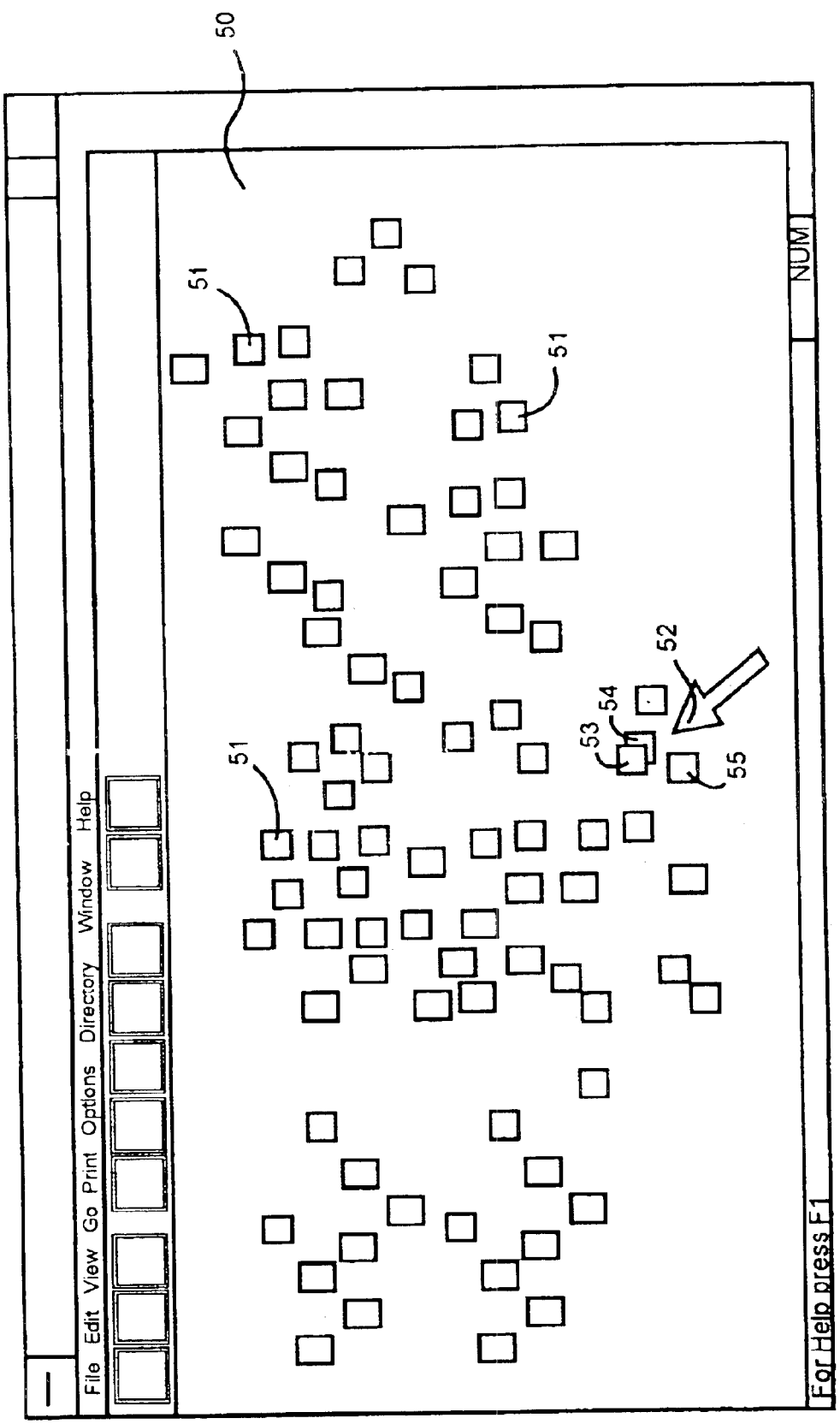
FIG. 2 is a diagrammatic view of a display screen illustrating an example of a cursor movement toward a target icon that is so crowded between adjacent icons that the clearance factor is less than the minimum for the particular cursor.
Figure 3:
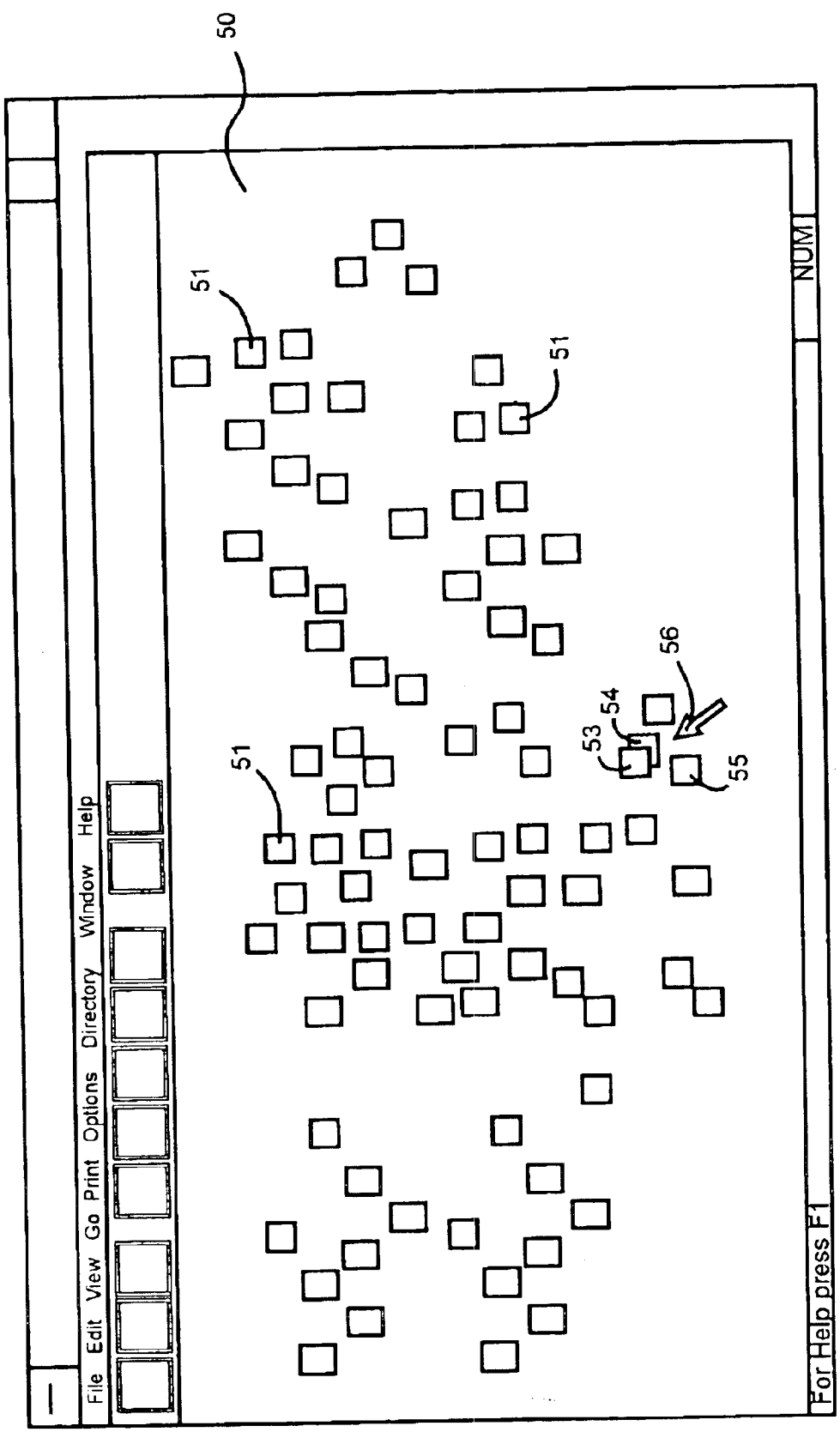
FIG. 3 is the diagrammatic display view of FIG. 2 but illustrating the substitution of a reduced size cursor having a reduced minimum clearance factor so that the clearance factor with respect to the target icon position now exceeds this reduced clearance factor.

With reference to FIG. 2, the display screen 50 shown has a great number of icons 51 (simplified to just squares for illustration). Actually the number of icons has also been minimized for this example. It is understood that there may be icons arranged in patterns of greater or lesser icon density, i.e. greater spacing between icons. Thus, as the cursor 52 is moved along and approaches an icon 54 surrounded by adjacent icons 54 and 55, a determination has to be made as to whether the cursor has a minimum clearance factor, i.e. a cursor 52 of the current size will have sufficient clearance to select icon 54. The process determines whether icon 54 being approached by cursor 52 has this minimum clearance factor in combination with means responsive to a determination that said approached item does not have said minimum clearance factor for reducing the size of said pointer to a pointer having a reduced minimum clearance factor that is appropriate for a selection of the target icon. How minimum clearance factors may be determined will be considered in greater detail in the examples of FIGS. 4 through 8. With respect to FIG. 2, with the arrangement of target icon 54, adjacent icons 53 and 55 with respect to approaching cursor 52, let us assume that the minimum clearance factor has not been exceeded. Then, as shown in FIG. 3, reduced size cursor 56 is substituted which has a reduced minimum clearance factor that is now exceeded by the arrangement shown so that reduced size cursor 56 has sufficient space to access and select icon 54.

Figure 4:
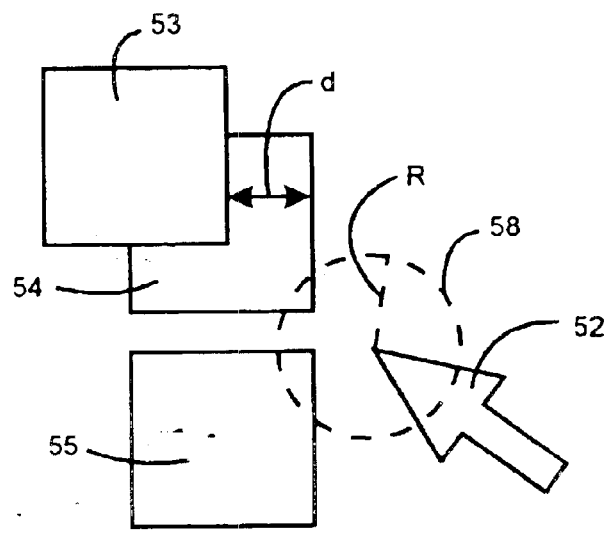
FIG. 4 is a magnified portion of the view of FIG. 2 illustrating the target icon arrangement of FIG. 2 with the full sized cursor.
Figure 5:
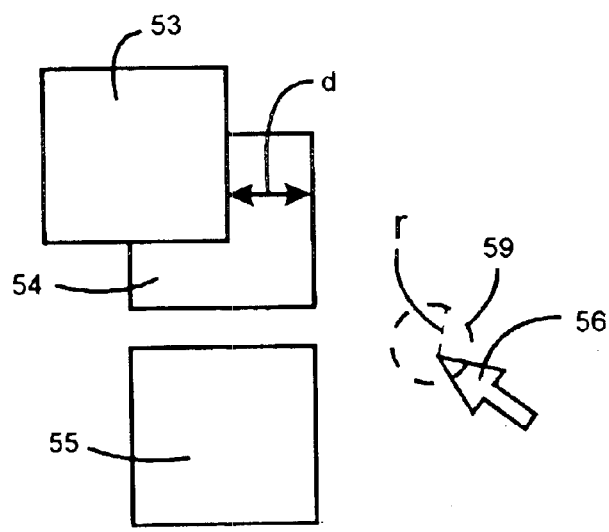
FIG. 5 is a magnified portion of the view of FIG. 3 illustrating the target icon arrangement of FIG. 3 with the reduced sized cursor.

Now, with respect to FIGS. 4 through 8, we will give some examples of how minimum clearance factors may be determined. In FIG. 4, the minimum clearance factor is shown as a radius R of halo 58 around the point of cursor 52. It may be determined whether the arrangement of the target icon 54 and its adjacent icons 53 and 55 exceed this minimum by simply determining whether the distance between the target icon and its closest adjacent icon does not exceed R. Then, the minimum clearance factor would merely be a minimum clearance distance between the target and adjacent icon. Since this does not exceed R, the cursor is too large and a reduced cursor must be substituted in order to select the icon.

While minimum clearance distance would certainly be operable in the present invention in determining whether the target icon is selectable with a full sized cursor, it is recognized that other factors, such as the widest visible dimension of the target icon, could be a determining factor in the calculation of a minimum clearance factor. For example, the following equation could be used in determining whether the minimum clearance factor has been exceeded:

Minimum Clearance=$d+s$ wherein:

d is the widest visible dimension of the approached icon, and s is the space between the approached icon and the closest adjacent icon in a continuation of the d dimension line.

The minimum clearance factor will be calculated in accordance with this equation in the examples of FIGS. 4 through 8.

In FIG. 4, s=0, since adjacent icon 53 abuts target icon 54, thus d+s=d, and d<R. Thus, the minimum clearance factor is not exceeded and the reduced size cursor 56 is substituted, FIG. 5, which has a halo 59 with a radius r. However, d>r, whereby the minimum clearance factor is exceeded and icon 54 may conveniently be selected by using reduced size cursor 56.

Figure 6:
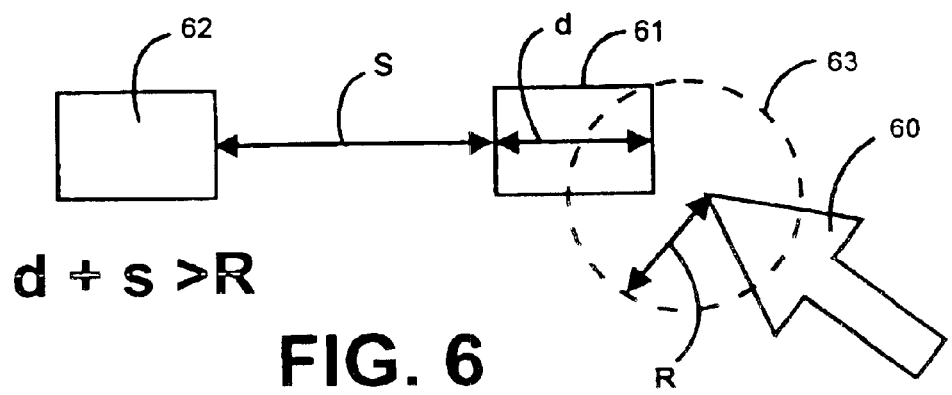
FIG. 6 is a magnified view of a cursor/target icon arrangement wherein the full sized cursor has a minimum clearance factor which is exceeded by the arrangement.
Figure 7:
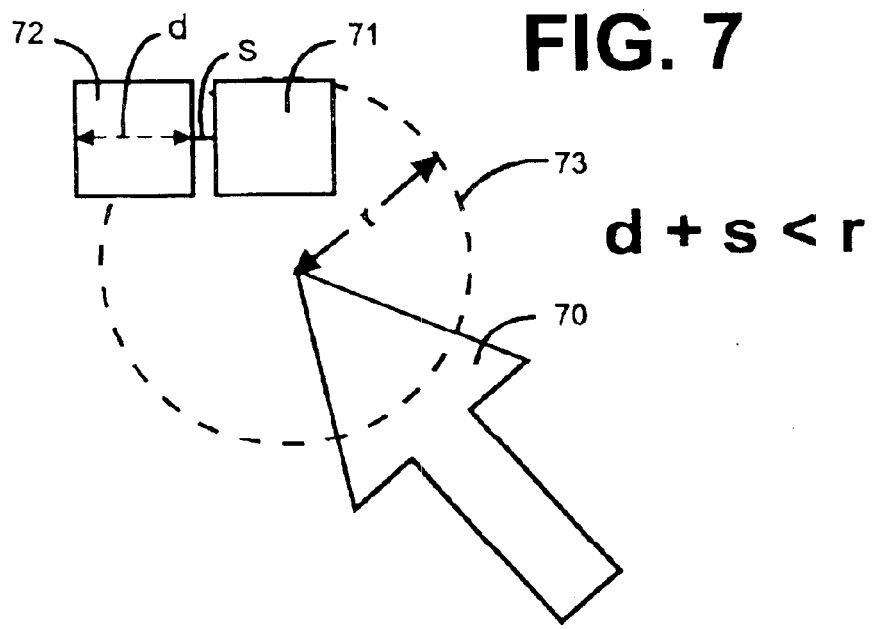
FIG. 7 is a magnified view of a cursor/target icon arrangement wherein the full sized cursor has a minimum clearance factor which is not exceeded by the arrangement.
Figure 8:
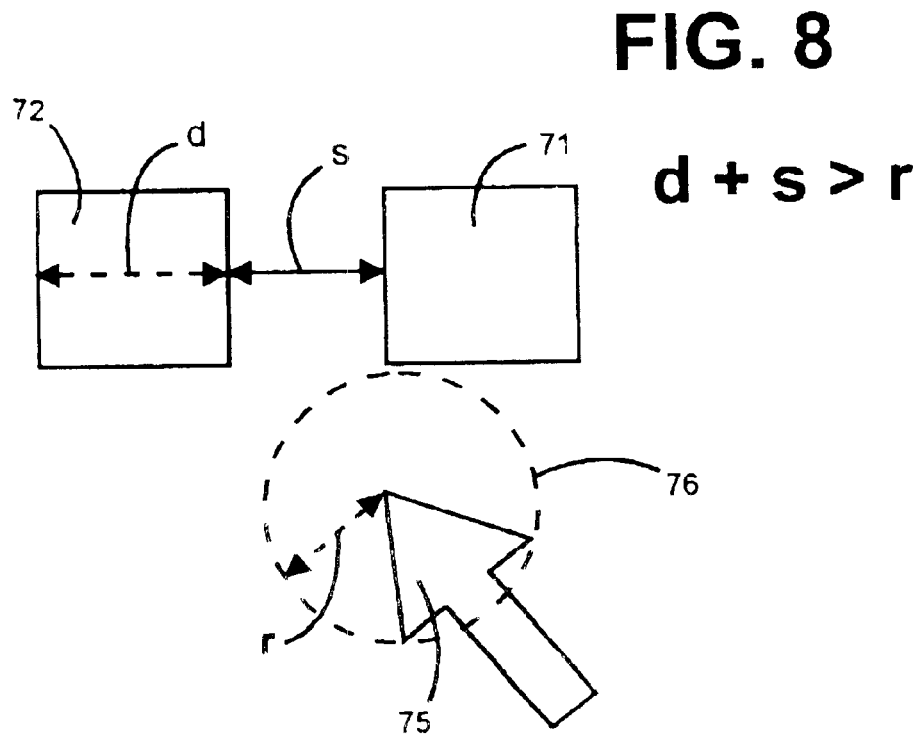
FIG. 8 is a magnified view of a cursor/target icon arrangement of FIG. 7 wherein a reduced sized cursor has been substituted with a minimum clearance factor which is exceeded by the arrangement.

In the example of FIG. 6, the space between target icon 61 is relatively distant from adjacent icon 62. Thus, s+ the widest dimension d of target cursor 61 far exceeds radius R of cursor halo 63 of cursor 60. Thus, the icon arrangement is sufficiently spaced that the full sized cursor 60 may be used to target icon 61. On the other hand, in FIG. 7, the dimension d of target icon 72 +s, the space from adjacent icon 71, is less than the radius R of cursor 70 halo 73. Thus, full sized cursor 70 is too large. As shown in FIG. 8, reduced cursor 75 is substituted wherein with radius r of the cursor halo 76, d+s>r, and reduced size cursor 75 may conveniently be used to make the selection of target icon 72.

Figure 9:
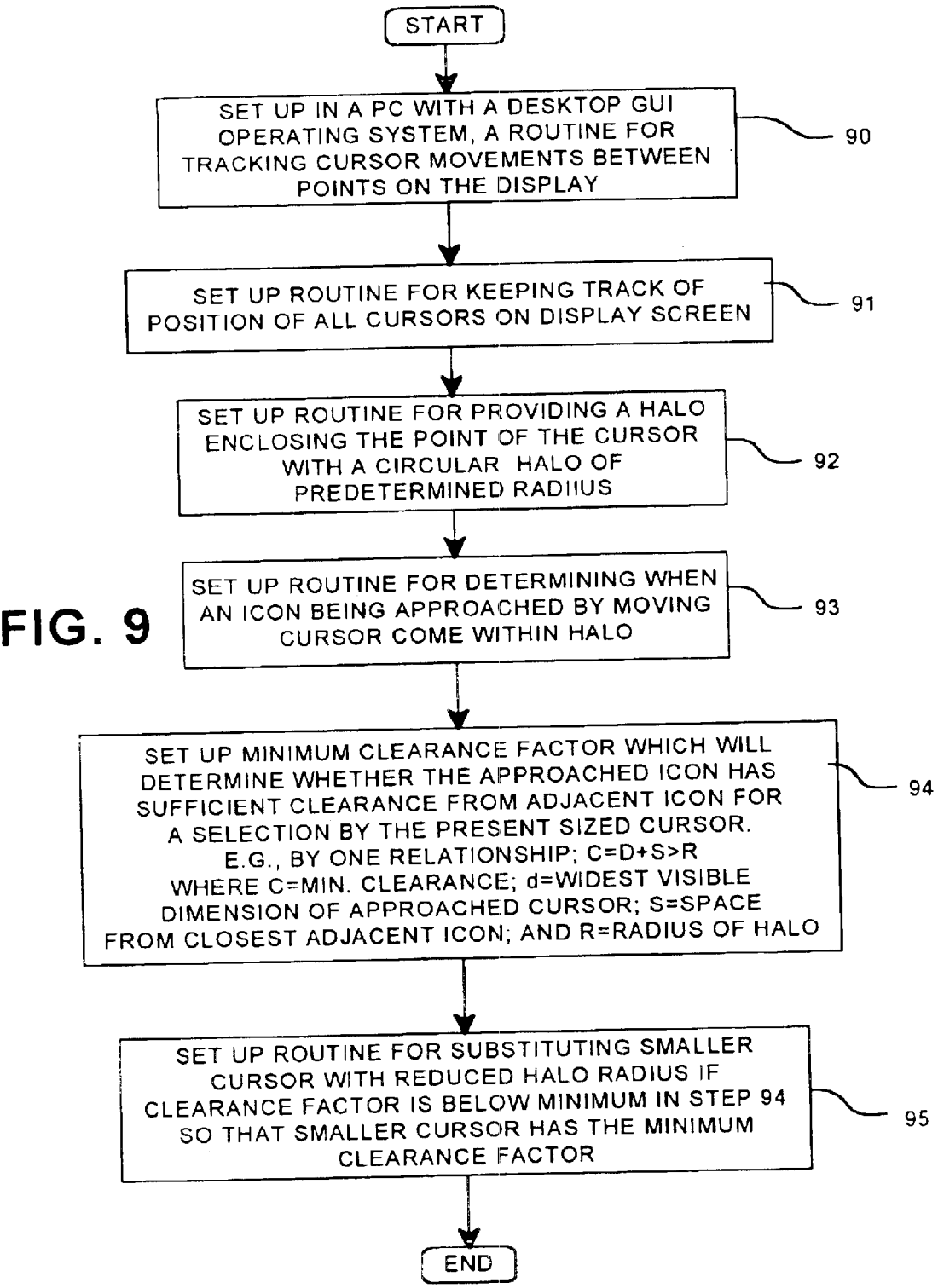
FIG. 9 is a flowchart of the program steps involved in setting up a process for the substitution of a reduced sized cursor when the cursor/target icon arrangement of the full size cursor fails to exceed the minimum clearance factor.
Figure 10:
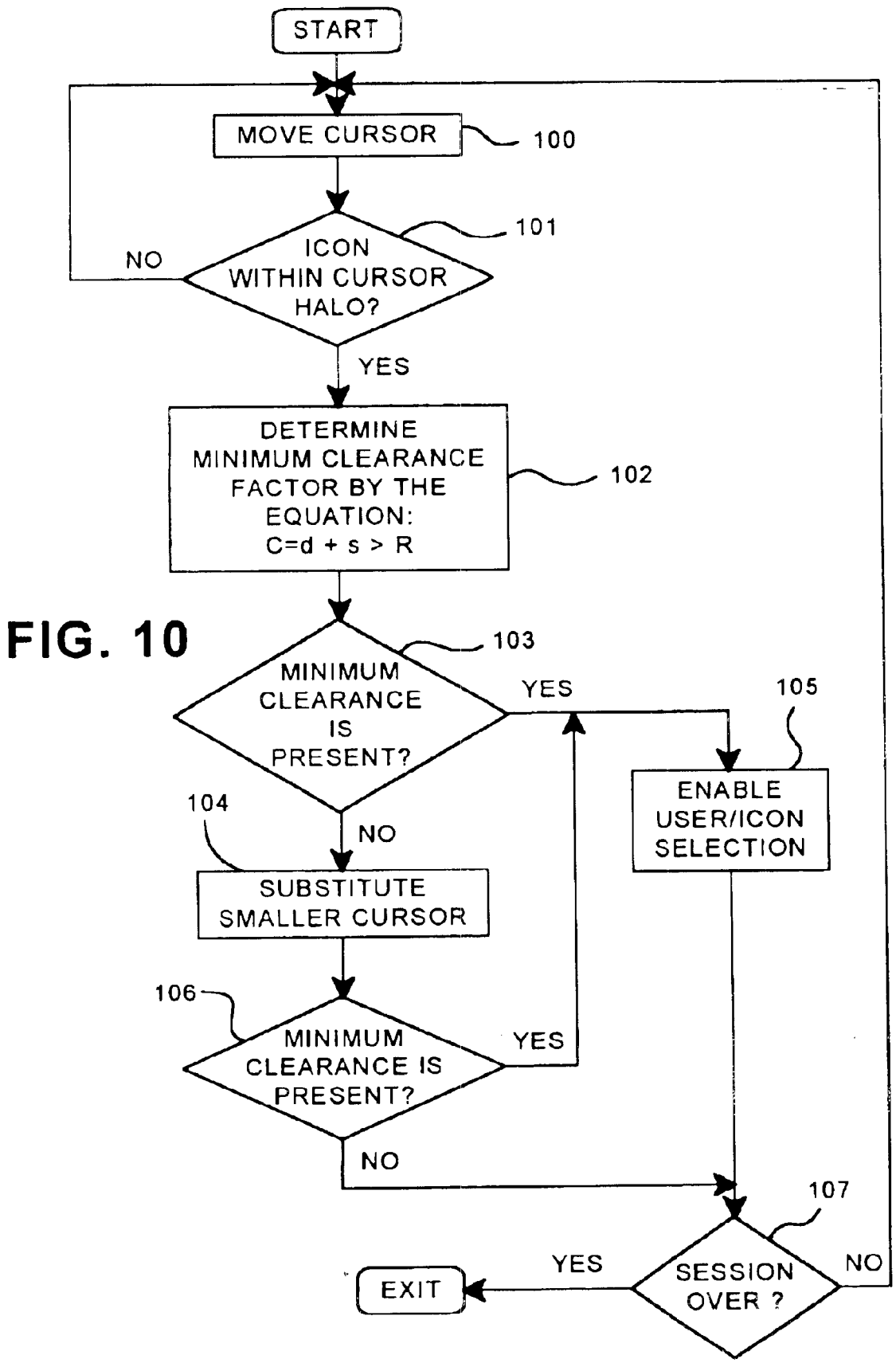
FIG. 10 is a flowchart of the steps involved in an illustrative run of the process set up in FIG. 9.

Now, with reference to FIGS. 9 and 10, we will describe a process implemented by the present invention in conjunction with the flowcharts of these figures. FIG. 9 is a flowchart showing the development of a process according to the present invention for distinguishing between closely spaced icons in a high icon density region of a display screen. In a personal computer set up with a desktop GUI and an operating system, a routine is provided for tracking cursor movements between points on a display screen, step 90. A routine is provided for tracking cursor positions on the display screen, step 91. A routine is set up for providing a circular halo with a predetermined radius around the cursor point, step 92. Then a routine is set up, step 93, for determining when an icon being approached by a cursor comes with the cursor halo. A process is set up for setting a minimum clearance factor that will determine whether the target icon has sufficient clearance from adjacent icons to permit a selection by the present sized cursor; for example, as set up above, the relationship: c=d+s>R, where c=minimum clearance; d=widest visible dimension of target icon; s=space from the closest adjacent icon; and R=radius of the halo, step 94. Then, a routine is set up for substituting a smaller cursor with reduced halo radius if the clearance factor is below the minimum in step 94 so that the smaller cursor has a radius r, whereby c=d+s>r, step 95.

The running of the process will now be described with respect to FIG. 10. First, step 100, the cursor is moved in the direction of an icon that the user wishes to select. A determination is made with respect to the moving cursor as to whether there is an icon within the halo surrounding the point of the cursor, step 101. If No, the movement continues, step 100. If Yes, the minimum clearance factor for this target icon is determined by the equation c=d+s>R, as described above, step 102, and a determination is made, step 103, as to whether there is minimum clearance. If Yes, the icon selection using the initial cursor is enabled, step 105. If the determination in step 103 is No, there is no minimum clearance present with the original cursor size, a smaller cursor is substituted, step 104. A further determination is made as to whether the reduced size cursor has a halo radius so small that minimum clearance is present, step 106. If Yes, then the icon selection using the original cursor is enabled, step 105. After step 105, or if the minimum clearance is still not met by the reduced size cursor, a No from step 106, then a determination may conveniently be made here as to whether the session is over, step 107. If Yes, the session is exited. If No, the flow is returned to step 100 where the cursor is moved.

In accordance with another aspect of the present invention, as shown in FIG. 11, where a group of icons are so closely clustered together that the icons/cursor arrangement initially fails to have minimum clearance, an icon enlargement sequence may be followed as shown in steps 1 through 4 enabling the user to reach his target icon. This is similar in operation to sequential highlighting sequence described in above-referenced copending application, Ser. No. 09/899,604, and the icon exposure sequence described in the above-referenced copending application, Ser. No. 09/899,616 . In step 1 of FIG. 11 there is an a cluster of icons, 113, 114 and 115 being approached by cursor 111 in an arrangement without minimum clearance, i.e. the cursor does not have enough room to select one of the clustered icons without encroaching upon the others. Accordingly, there is a sequence followed in which each of the cluster of icons 113 through 115 are enlarged relative to the cursor so that the cursor 111 will have at least minimum clearance to the icon. In step 2, icon 113 is enlarged, in step 3, icon 114 is enlarged, and in step 4, icon 115 is enlarged. From the size of the cursor relative to the enlarged icon, it is obvious that even with the specific equation for determining clearance, as set forth above, d, the widest visible dimension of the enlarged target icon will be greater than the radius of halo 116 around pointer 111. Thus, there is minimum clearance with the enlarged icons.

Also, dependent upon the closeness of the separation, even with the enlarged icon providing minimum clearance, there may be arrangements of icons where each icon is only activated, i.e. enabled for selection only when the icon is enlarged. The sequential icon enlargement process need not be automatic. A first icon in the cluster or set may be enlarged first, e.g. the icon closest to the cursor. The user may then select it by moving his cursor into the enlarged icon, avoiding the adjacent non-enlarged icons and clicking on one of his mouse buttons to make the selection.

Otherwise, the user may without moving his cursor step to enlarge the next icon in the sequence by clicking on the other of his mouse buttons.

One of the implementations of the present invention is as an application program 40 made up of programming steps or instructions resident in RAM 14, FIG. 1, during computer operations. Until required by the computer system, the program instructions may be stored in another readable medium, e.g. in disk drive 20 or in a removable memory, such as an optical disk for use in a CD ROM computer input or in a floppy disk for use in a floppy disk drive computer input. Further, the program instructions may be stored in the memory of another computer prior to use in the system of the present invention and transmitted over a LAN or a WAN, such as the Internet, when required by the user of the present invention. One skilled in the art should appreciate that the processes controlling the present invention are capable of being distributed in the form of computer readable media of a variety of forms.

Although certain preferred embodiments have been shown and described, it will be understood that many changes and modifications may be made therein without departing from the scope and intent of the appended claims.

What is claimed is:

1. In a computer controlled user interactive display system, a display interface implementation for enabling an interactive user to select specific items on a display screen with crowded selectable items comprising:

user controlled means for moving an on-screen pointer to approach said selectable items; means for setting a predetermined minimum clearance factor required for user selection of an item by said pointer, said factor determined by a visible dimension of the approached item and the visible space between said approached item and adjacent items;

means for determining whether a selectable item being approached by said pointer has said minimum clearance factor;

and means responsive to a determination that said approached item does not have said minimum clearance factor for reducing the size of said pointer.

2. The display system of claim 1 wherein said items are icons.

3. The display system of claim 2 wherein said reduced size pointer has a reduced minimum clearance factor.

4. The display system of claim 3 wherein said minimum clearance factor is defined by:

$$\text{Minimum Clearance} = d+s$$

wherein:

d is the widest visible dimension of the approached icon, and s is the space between the approached icon and the closest adjacent icon in a continuation of the d dimension line.

5. In a computer controlled user interactive display system, a display interface implementation for enabling an interactive user to select specific icons on a display screen with crowded selectable items comprising:

user controlled means for moving an on-screen pointer to approach said selectable icons;

means for setting a predetermined minimum clearance factor required for user selection of an item by said pointer, said minimum clearance distance determined by a visible dimension of the approached icon and the visible space between said approached icon and adjacent icons;

means for determining whether a selectable icon being approached by said pointer has within said minimum clearance distance from said pointer;

means for determining whether said approached icon has said minimum clearance distance from its adjacent; and means responsive to a determination that said approached icon does not have said minimum clearance distance from adjacent icons for automatically reducing the size of said pointer.

6. The display system of claim 5 wherein said reduced size pointer has a reduced minimum clearance distance whereby said approached icon does have said minimum clearance distance from adjacent icons.

7. The method of claim 5 wherein said reduced size pointer has a reduced minimum clearance distance whereby said approached icon does have said minimum clearance distance from adjacent icons.

8. A method for enabling an interactive user to select specific items on a display screen with crowded selectable items in computer controlled user interactive display systems comprising:

moving an on-screen pointer to approach said selectable items; setting a predetermined minimum clearance factor required for user selection of an item by said pointer; determining whether a selectable item being approached by said pointer has said minimum clearance factor, said factor determined by a visible dimension of the approached item and the visible space between said approached item and adjacent items; and reducing the size of said pointer responsive to a determination that said approached item does not have said minimum clearance factor.

9. The method of claim 8 wherein said items are icons.

10. The method of claim 9 wherein said reduced size pointer has a reduced minimum clearance factor.

11. The method of claim 10 wherein said minimum clearance factor is defined by:

$$\text{Minimum Clearance} = d+s$$

wherein:

d is the widest visible dimension of the approached icon, and s is the space between the approached icon and the closest adjacent icon in a continuation of the d dimension line.

12. A method enabling an interactive user to select specific selectable icons on a display screen with crowded selectable icons in computer controlled user interactive display systems comprising:

moving an on-screen pointer to approach said selectable icons;

setting a predetermined minimum clearance distance required for user selection of an icon by said pointer, said minimum clearance distance determined by a visible dimension of the approached icon and the visible space between said approached icon and adjacent icons;

determining whether a selectable icon being approached by said pointer is within said minimum clearance distance from said pointer;

determining whether said approached icon has said minimum clearance distance from its adjacent icons; and automatically reducing the size of said pointer responsive to a determination that said approached icon does not have said minimum clearance distance from adjacent icons.

13. A computer program having program code included on a computer readable medium for enabling an interactive user to select specific items on a display screen with crowded selectable items in a computer controlled user interactive display system comprising:

user controlled means for moving an on-screen pointer to approach said selectable items;

means for setting a predetermined minimum clearance factor required for user selection of an item by said pointer, said factor determined by a visible dimension of the approached item and the visible space between said approached item and adjacent items;

means for determining whether a selectable item being approached by said pointer has said minimum clearance factor; and means responsive to a determination that said approached item does not have said minimum clearance factor for reducing the size of said pointer.

14. The computer program of claim 13 wherein said items are icons.

15. The computer program of claim 14 wherein said reduced size pointer has a reduced minimum clearance factor.

16. The computer program of claim 15 wherein said minimum clearance factor is defined by:

$$\text{Minimum Clearance} = d + s$$

wherein:

d is the widest visible dimension of the approached icon, and s is the space between the approached icon and the closest adjacent icon in a continuation of the d dimension line.

17. A computer program having program code included on a computer readable medium for enabling an interactive user to select specific icons on a display screen with crowded selectable icons in a computer controlled user interactive display systems comprising:

user controlled means for moving an on-screen pointer to approach said selectable icons;

means for setting a predetermined minimum clearance distance required for user selection of an icon by said pointer, said minimum clearance distance determined by a visible dimension of the approached icon and the visible space between said approached icon and adjacent icons;

means for determining whether a selectable icon being approached by said pointer is within said minimum clearance distance from said pointer;

means for determining whether said approached icon has said minimum clearance distance from its adjacent icons; and means responsive to a determination that said approached icon does not have said minimum clearance distance from adjacent icons for automatically reducing the size of said pointer.

18. The computer program of claim 17 wherein said reduced size pointer has a reduced minimum clearance distance whereby said approached icon does have said minimum clearance distance from adjacent icons.

* * * * *

UNITED STATES PATENT AND TRADEMARK OFFICE
CERTIFICATE OF CORRECTION

PATENT NO. : 6,844,887 B2
DATED : January 18, 2005
INVENTOR(S) : Laffey et al.

It is certified that error appears in the above-identified patent and that said Letters Patent is hereby corrected as shown below:

Column 7,
Line 59, please delete "items"and insert -- icons --;
Line 63, please delete "factor" and insert -- distance --;
Line 63, please delete "item" and insert -- icon --;

Column 8,
Line 5, after "adjacent" please insert -- icons --;

Signed and Sealed this

Twenty-fourth Day of May, 2005

JON W. DUDAS
*Director of the United States Patent and Trademark Office*